United States Patent [19]

Anesa et al.

[11] Patent Number: 5,050,424
[45] Date of Patent: Sep. 24, 1991

[54] TELECOORDINOMETER

[75] Inventors: Francesco Anesa; Alessandro Azzoni, both of Bergamo; Giuseppe Guerini, Schilpario; Marco Vergani, Imbersago, all of Italy

[73] Assignee: Ismes S.p.A., Bergamo, Italy

[21] Appl. No.: 555,040

[22] Filed: Jul. 18, 1990

[30] Foreign Application Priority Data

Jul. 20, 1989 [IT] Italy ................... 21249 A/89

[51] Int. Cl.⁵ .......................................... G01M 5/00
[52] U.S. Cl. ...................................... 73/1 D; 73/786
[58] Field of Search ................ 73/865.9, 1 R, 1 D, 73/784, 786; 250/231.1, 231.11; 356/32, 373, 375, 243; 358/107, 108

[56] References Cited

U.S. PATENT DOCUMENTS 3,594,773  7/1971  Conkle et al. ................ 340/690
4,931,659  6/1990  Sabater et al. ............... 356/243
4,947,692  8/1990  Koppel ........................ 73/786

FOREIGN PATENT DOCUMENTS 0800605  1/1981  U.S.S.R. ..................... 73/786

Primary Examiner—Robert Raevis
Attorney, Agent, or Firm—Hedman, Gibson, Costigan & Hoare

[57] ABSTRACT

The telecoordinometer (1) is capable of detecting the movements and/or the oscillations of a structure (8) it is associated with. It comprises an absolute reference element constituted by an either horizontally or vertically taut line (2, 2A) and a detection apparatus (3, 3A) integrally affixed to the monitored structure (8), capable of detecting the movements and/or the oscillations according to at least one direction of said taut line (2, 2A) relatively to the structure (8).

8 Claims, 9 Drawing Sheets

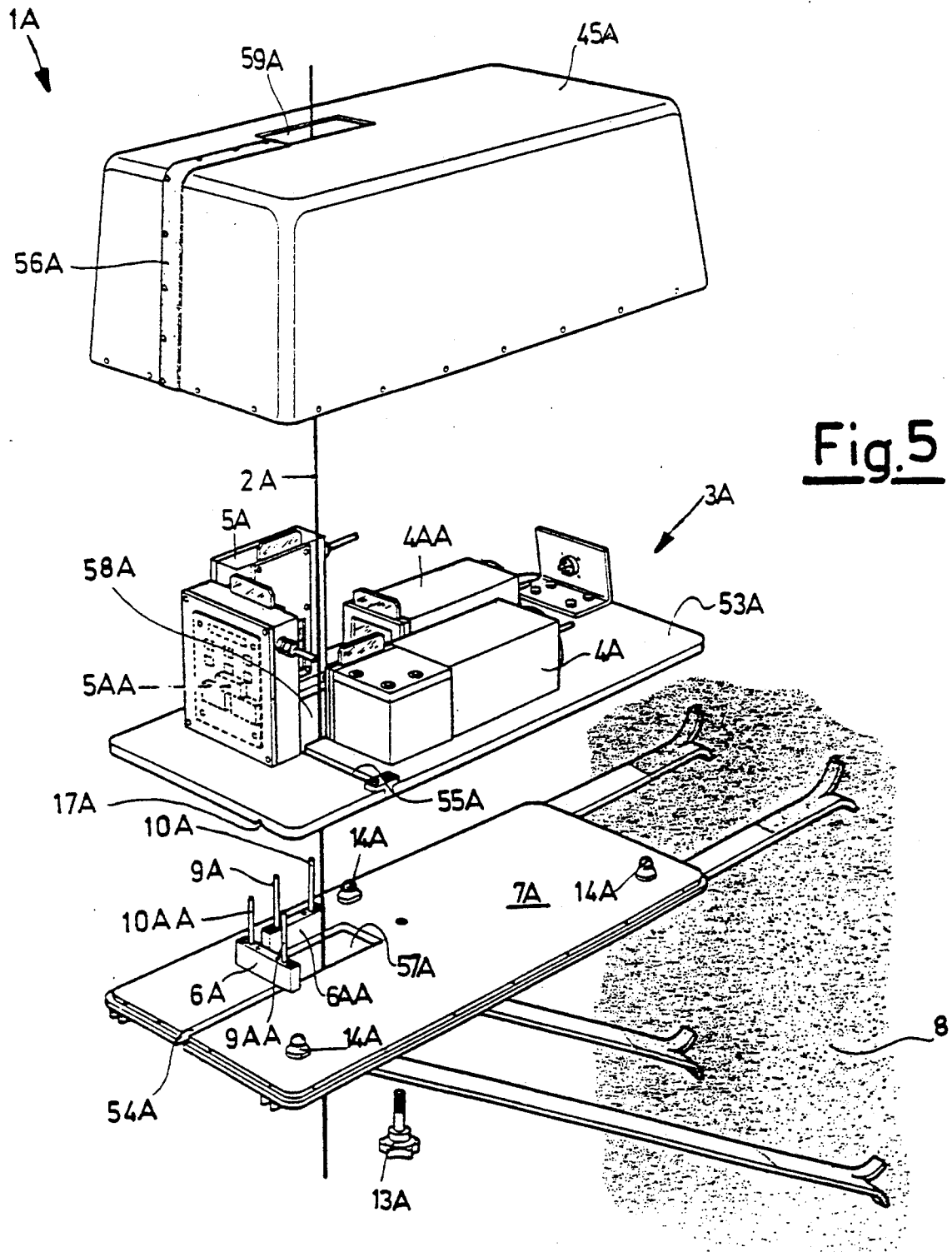

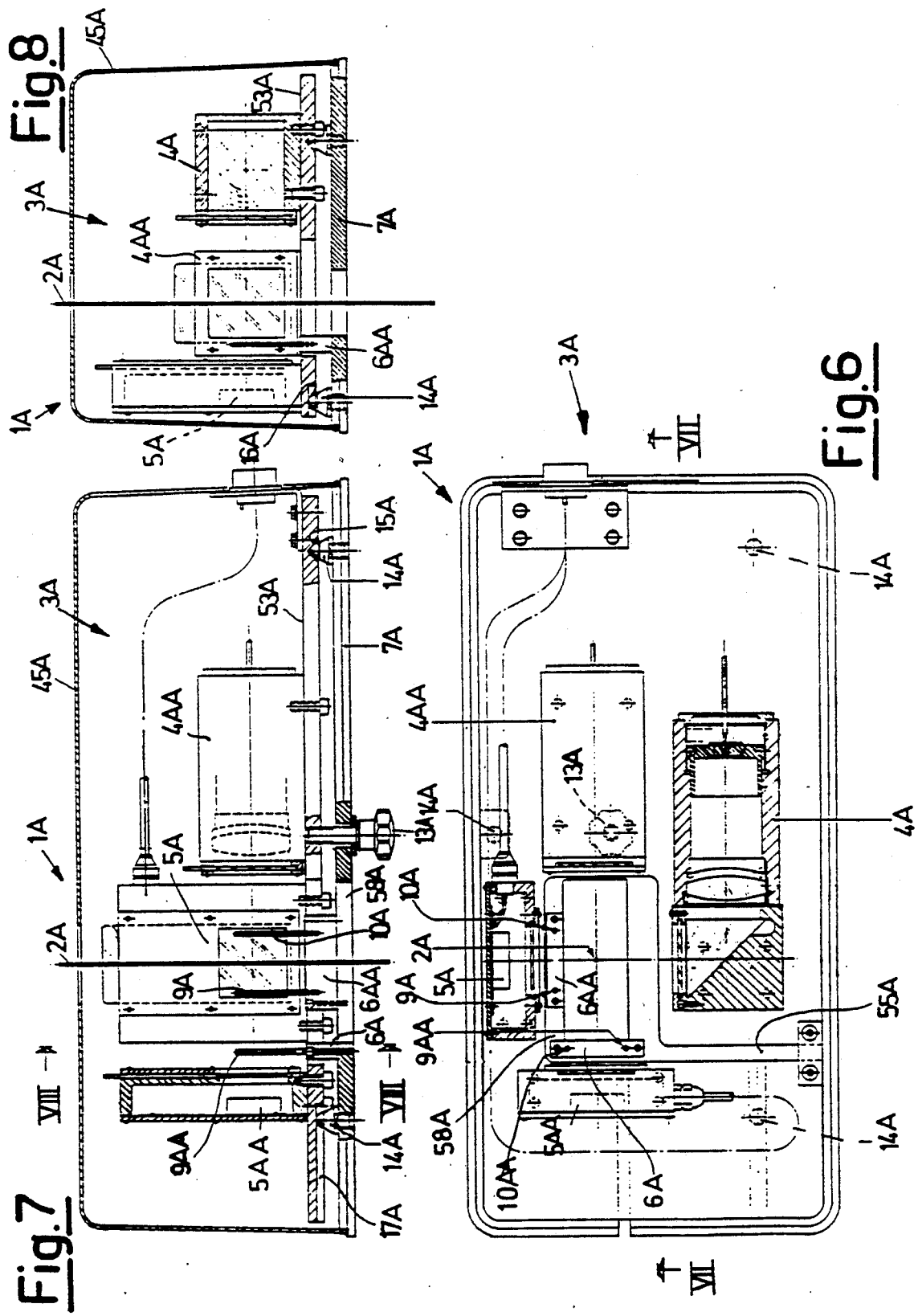

TELECOORDINOMETER

The present invention relates to a telecoordinometer.

As those skilled in the art are well aware of, the big structures, such as dams, smoke-stakes and the like, undergo oscillations and/or temporary or permanent shifts, which, owing to reasons relevant to safety and/or study, have to be known. For such a purpose, telecoordinometers are used.

The telecoordinometers known from the prior art essentially comprise a reference element, taken as the absolute reference, and an apparatus (integrally affixed to the structure to be monitored), which is capable of detecting the position of the same structure relatively to said absolute reference element.

The absolute reference element is constituted by a taut vertical line, or by an also taut, horizontal line.

The taut vertical line, commonly known as "plumb line", can be of two types: the straight type, or the reverse type.

In the straight type of plumb line the upper end of the line is constrained to the top of the structure, and the bottom end of the line is constrained to a mass which gives said line the necessary tension.

In the reverse plumb line, the bottom end of the line is, on the contrary, constrained to the ground under the foundation of the structure; and the upper end of said line is constrained to a float (usually immerged in oil), which keeps the same line taut thanks to the Archimedean thrust it is submitted to. Finally, the horizontal line has one of its ends constrained, and the other end thereof is taut by means of a device comprising a pulley and a counterweight.

The pulley and the conterweight are necessary in order to compensate for the expansions of the line, or, better, the increases in the camber of the catenary, due to the effects of temperature.

Each one of the absolute reference elements as above mentioned shows typical structural characteristics which are well-known to those skilled in the art, which recommend the use thereof according to the type of structure to be monitored and/or according to the type of apparatus selected in order to detect the position.

The just illustrated absolute reference elements constitute an integrant part of several types of telecoordinometers.

Some of said types of telecoordinometers are synthetically illustrated in the following.

A first type of telecoordinometer comprises an apparatus formed by an angular rotation transducer actuated by a fork kept into engagement with the relevant horizontal line. The shifts of the same line cause a rotation of the axis of the transducer, which supplies the value of the change in rotation angle, from which the shift is computed by means of a geometrical process.

The main drawback of such a telecoordinometer is due to the fact that its precision is limited, owing to the contact with the line and the presence of moving organs.

In fact, the movement measured by the angle transducer is caused by the dragging of the fork by the line. Unfortuntely, the moving portion of the transducer conditions the line shift, above all as a consequence of the ageing of the bearing on which the shaft of the transducer rotates.

The conditioning the line is subject to also results in disturbances to the measurements carried out by any other possible instruments which use the same line as their absolute reference element.

Further drawbacks are the following:

the measurement of the shifts of the structure can be carried out according to one axis only;

the maintenance operations are burdensome;

the instrument is not capable of carrying out its own functional self-check and its own self-calibration.

A second type of telecoordinometer comprises an apparatus for detecting the position of the structure, which apparatus comprises two pairs of horizontal-axis coils, one pair of coils per each axis according to which the measurement is carried out.

A vertical-axis coil generates a linear magnetic field in the central region of the instrument.

A metal core is inserted in the central region of said coils and is axially constrained to the plumb line.

The metal core perturbates the magnetic field, causing the intensity of this latter to change as a function of its own position relatively to the horizontal-axis coils which, by detecting the change in intensity of the magnetic field, make it possible the shift values to be determined.

Such a type of telecoordinometer, although overcomes the preceding one, above all thanks to the absence of moving organs, cannot be installed whenever the use of the horizontally taut line has to be adopted, owing to the presence of the large metal core, which must be supported by the same line. Furthermore, the installation of the detection equipment used in order to detect the position of the monitored structure requires the line to be dismantled, in case said line is already installed.

Further drawbacks are the following:

the maintanance operations are burdensome;

the instrument is capable of performing its own functional self-check and of carrying out its self-calibration, but limitedly to the only electronic unit.

A third type of telecoordinometer known from the prior art comprises an equipment for detecting the position of the structure, which comprises a slide with an "U"-shaped outline, moved by a linear stepper motor. The slide bears on one of its sides two IR-emitter diodes and on the other side two receivers, forming two mutually perpendicular barriers orientated at 45° relatively to the direction of movement of the same slide.

During the reading step, the slide is moved by the stepper motor; at the line the I.R. light beams are interrupted and supply the consensus to the two measurements, from which, by means of a trigonometric procedure, the coordinates of the line are obtained.

Such a type of telecoordinometer does not enable the position of the same line to be continuously monitored, in that the reading speed is limited by the speed of advancement of the "U"-shaped slide actuated by the stepper motor.

Furthermore, the moving organs it is composed by are subject to wear, with the reliability and precision during time being limited.

This instrument is endowed with the typical feature that it performs the measurements relatively to two reference elements integral with the structure; said reference elements make it also possible the instrument to be removed (and subsequently re-positioned) without the previously read values getting lost (in absolute terms).

A fourth telecoordinometer type comprises an equipment for detecting the position of the structure, in which a light source and a receiving/measuring device are installed.

The light source is constituted by a LED positioned in the focal point of an objective which collimates the light beam in the region of the plumb line.

The receiving/measuring device collects the collimated beam and focuses it, e.g., on a CCD array composed by 512 elements. A small lens focuses (between two fixed positions) the plumb line on the array.

The array supplies the measured value to an electronic unit, which sends it to the control system.

Such a type of telecoordinometer is characterized by a limited resolution (about 0.15 mm), in that the image of the line is considerably demagnified by the focusing lens.

Furthermore, the focusing lens operates by means of two planes defined during the adjustment step; therefore, if the taut line undergoes a shifting in the direction parallel to the optical axis, the image gets out of focus, and therefore a proportionally wrong detection of CCD array is obtained. Furthermore, the transducer has considerably big dimensions, is suitable for applications on vertical lines, is not very suitable for use on horizontal lines, and finally does not contain devices for functional self-check and self-calibration.

Furthermore in none of the above illustrated telecoordinometers, except for the one equipped with the "U"-shaped slide, the replacement of the apparatus used in order to detect the position of the monitored structure can be carried out without losing the values of position, which were measured until the time of said replacement of the old apparatus with the new one.

Furthermore, even if the operations of removal and of replacement are practically simultaneous, and inasmuch as the previously carried out measurements have to be reset, one cannot verify whether the two concerned apparatuses would give a same value for a same position of the taut line.

In this regard, it is important to stress that the useful life of the monitored structures can reasonably make one foresee that the position monitoring apparatus used for monitoring the structure position will have to be replaced a plurality of times, rendering it difficult to establish the necessary continuity between the various measurement periods.

The purpose of the instant invention is of providing a telecoordinometer which is capable of obviating simultaneously all of the drawbacks which affect the telecoordinometers known from the prior art, i.e., which is mainly capable of making it possible the measurements to be carried out automatically, continuously, with no contact with the taut line and without moving organs; and furthermore of making it possible the static behaviour during time of the monitored structure to be reconstructed without discontinuities.

Such a purpose is achieved by a telecoordinometer in particular for detecting during time the shifts of a structure constrained to earth, which comprises an absolute reference element having a rectilinear main axis; and means for detecting the position of said structure relatively to said absolute reference element, characterized in that between said absolute reference element and said means for detecting the position of the monitored structure a relative reference element is operatively interposed, which is integrally affixed, without possibility of removal, to the structure, with said means for detecting the position of the structure performing the evaluation of the shift of the structure anchored to earth by detecting the change in the distance of the relative reference element integral with the structure relatively to the absolute reference element.

The present invention is illustrated for merely exemplifying, non-limitative purposes, in the figures of the hereto attached drawing tables.

FIG. 5 shows an exploded view of a telecoordinometer according to the present invention, accomplished in bidirectional version;

FIG. 6 shows a partially sectional plan view of the telecoordinometer according to FIG. 5;

FIG. 7 shows a sectional view made along the path line VII—VII of FIG. 6;

FIG. 8 shows a sectional view made along the path line VIII—VIII of FIG. 7;

Figure 1:
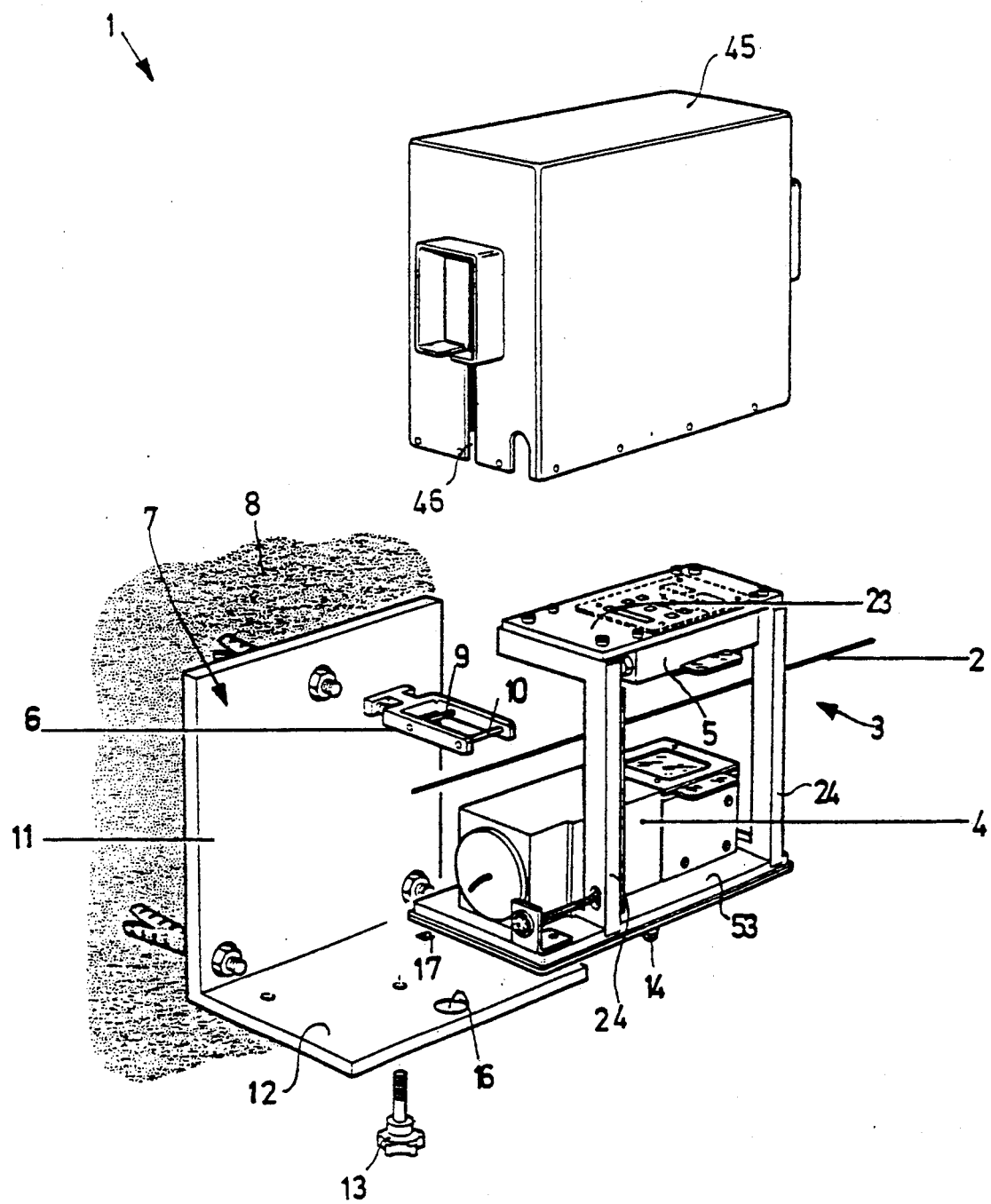
FIG. 1 shows an exploded view of a telecoordinometer according to the present invention, accomplished in unidirectional version.
Figure 2:
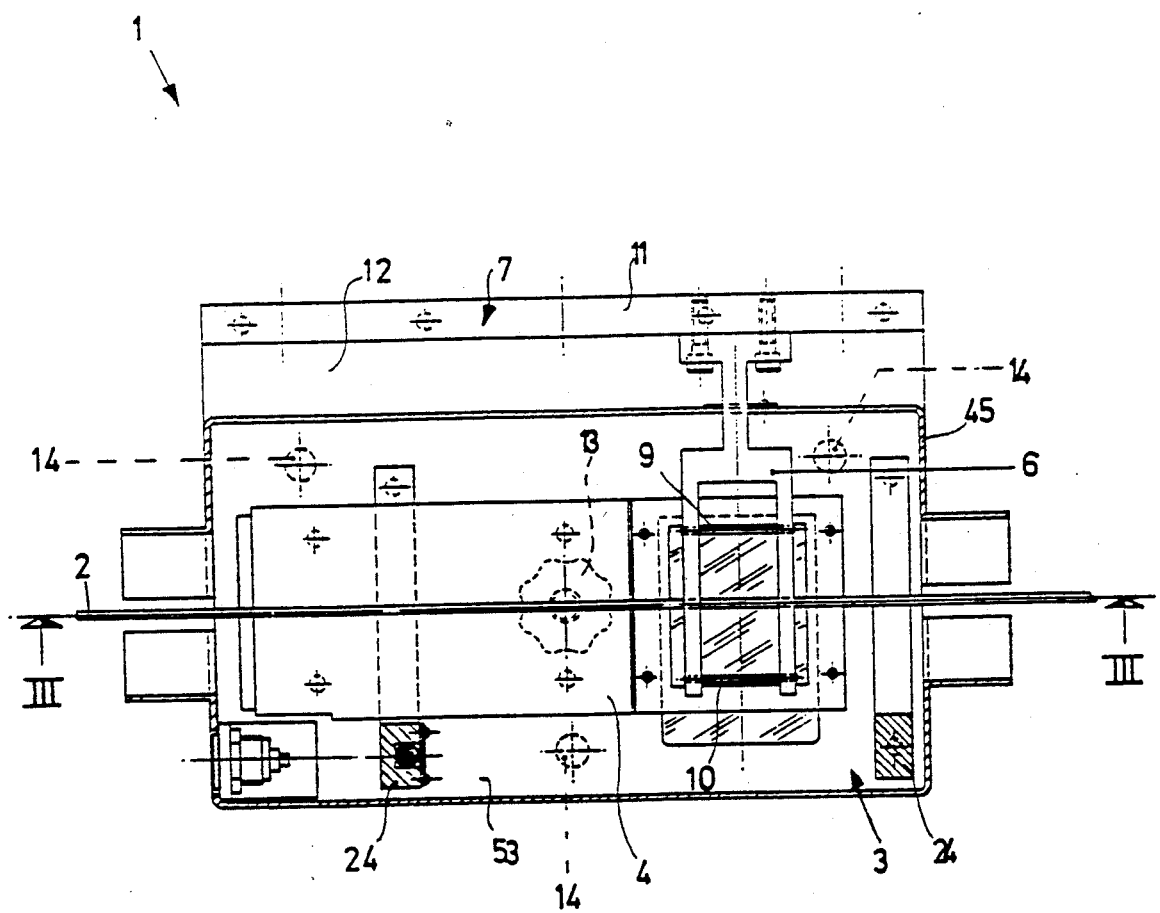
FIG. 2 shows a partially sectional plan view of the telecoordinometer according to FIG. 1.
Figure 3:
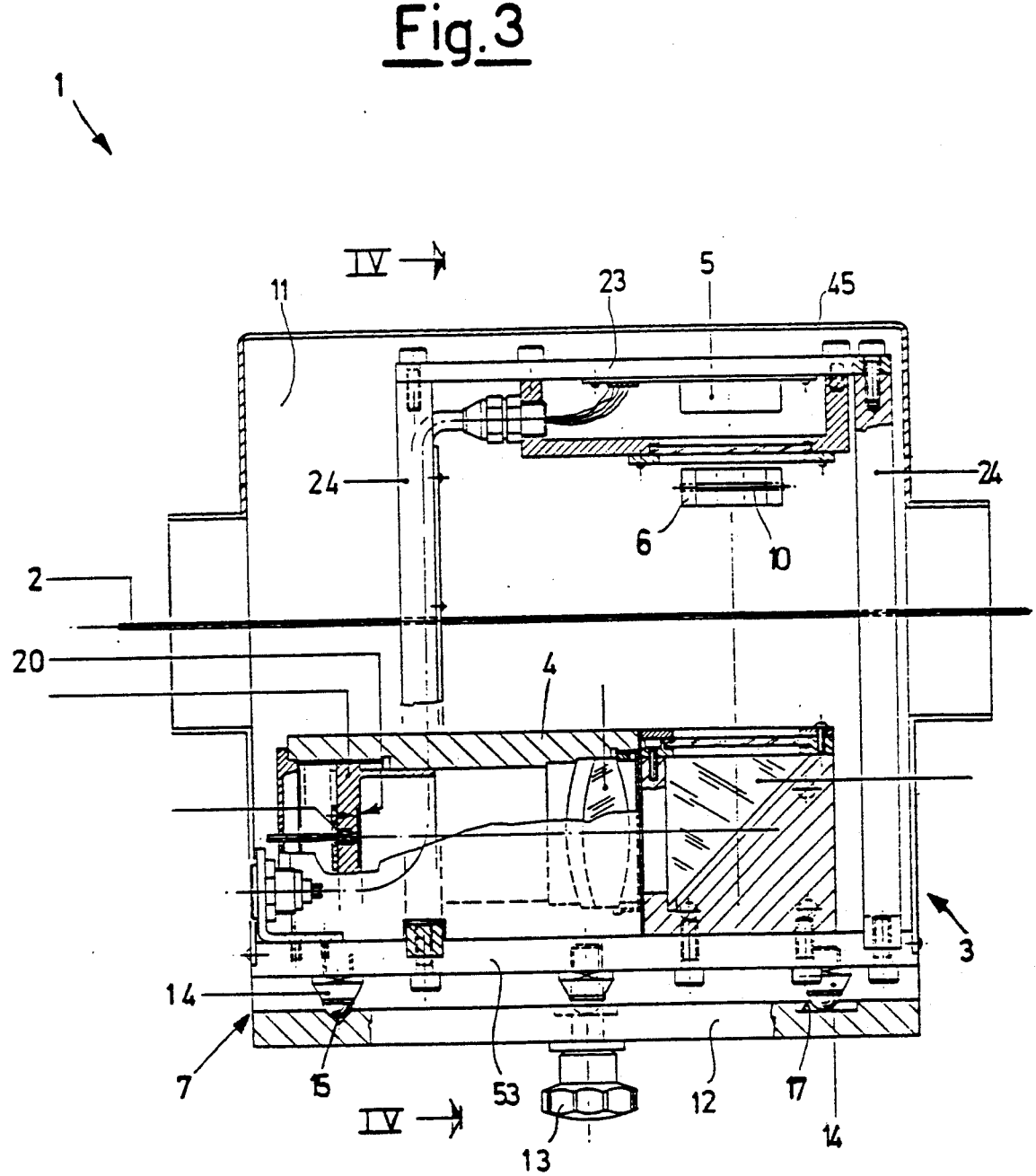
FIG. 3 shows a sectional view made along the path line III—III of FIG. 2.
Figure 4:
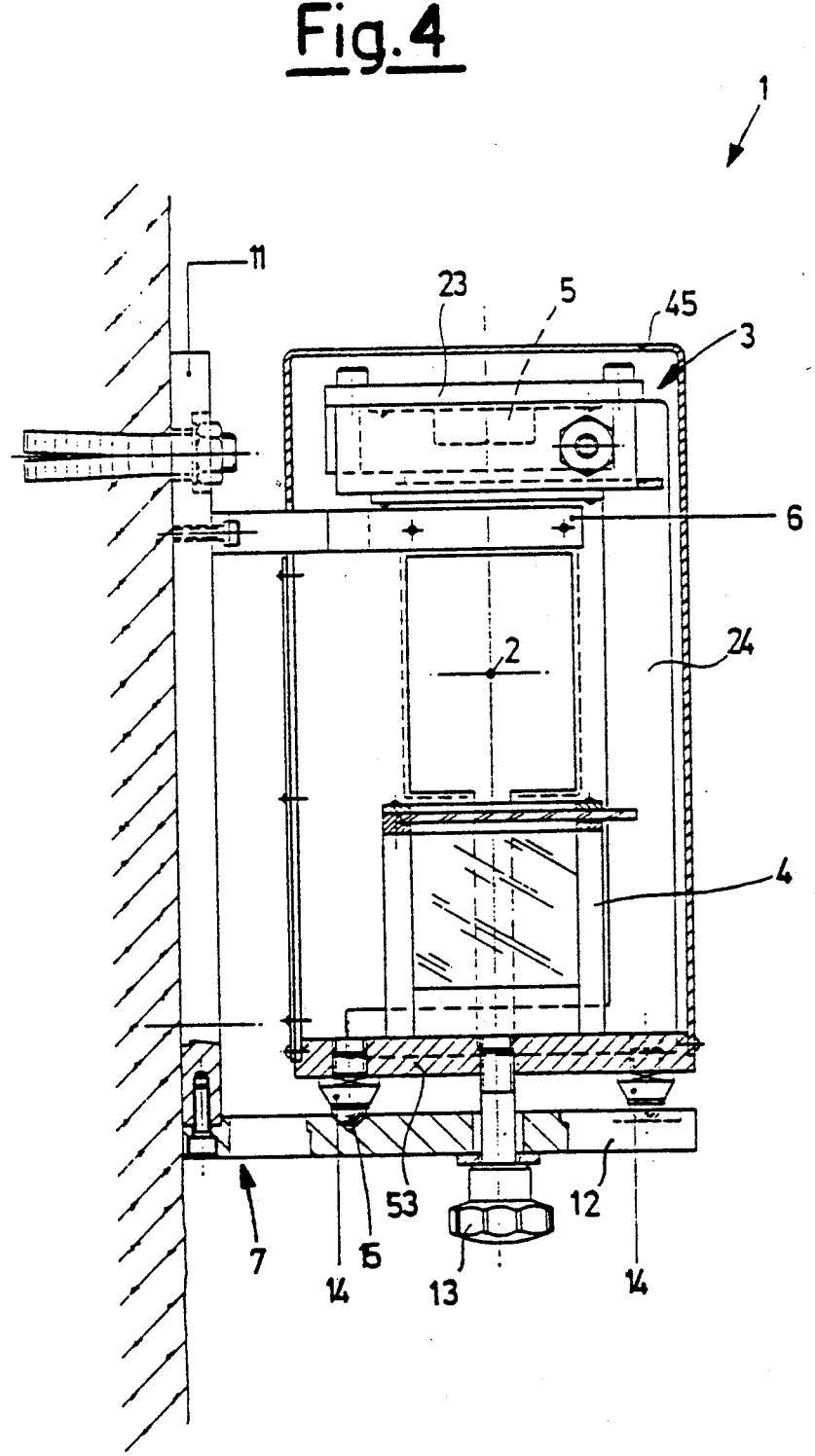
FIG. 4 shows a sectional view made along the path line IV—IV of FIG. 3.

Referring to the above listed figures, the telecoordinometer according to the present invention, generally indicated with the reference numeral 1 (FIG. 1) and 1A (FIG. 5) can be accomplished in two versions, i.e.: a first version suitable for detecting the shifts of the monitored structure along one direction only (unidirectional telecoordinometer) and a second version, suitable for detecting the shifts of the monitored structure along two directions (bidirectional telecoordinometer).

In both cases, the telecoordinometer comprises an absolute reference element with a main rectilinear axis, means for detecting the position of the monitored structure relatively to said absolute reference element, and a relative reference element integrally affixed, without possibility of removal, to the structure, and operatively interposed between said absolute reference element and said means for detecting the position of the monitored structure.

More specifically, and referring in particular to an unidirectional telecoordinometer 1, shown in FIGS. 1-4, the absolute reference element comprises, e.g., a traditional taut horizontal line 2.

The means for detecting the position of the structure relatively to said reference element comprise a detector apparatus 3, composed by an optical emitter unit 4 and a receiver element 5 constrained to a base 53.

The relative reference element comprises a fork-shaped support 6 fastened, without possibility of removal, by means of the vertical portion 11 of an "L"-shaped plate 7 to the structure 8 to be monitored.

The fork-shaped element 6 bears at least one reference pin; in particular, in the structure taken into consideration in the instant case, a first pin 9 and a second pin 10, parallel to each other and positioned at opposite sides relatively to the line 2.

The horizontal portion 12 of the "L"-shaped plate 7 supports, with possibility of removal, the detector apparatus 3. Said detector apparatus 3 is fastened to said horizontal portion 12 by means of a knob screw 13 which passes through the horizontal portion 12 and gets engaged inside a corresponding screw-threaded bore provided in the base 53.

Between the "L"-shaped plate 7, and in particular between its horizontal portion 12 and the base 53 of the detector apparatus 3 forced-trueing/positioning means are provided which, in the herein illustrated case, are of male-female type, wherein the male portions are associated with the base 53 of the detector apparatus 3 and the female portion are associated with the horizontal portion 12 of the "L"-shaped plate 7.

The male elements comprise at least three non-aligned, spherical-end feet 14; said female elements comprise a cone-shaped hollow 15, a cylindrical hollow 16, the diameter of which is larger than of the spherical end of the relevant foot 14, and a triangular-cross-section groove 17, whose main axis is parallel to the axis of the taut horizontal line 2.

The "L"-shaped plate 7, the base 53 and the uprights 24 of the apparatus 3 are made from invar for controlling thermal expansion and for making precise measurements in the presence of considerable temperature changes.

Figure 9:
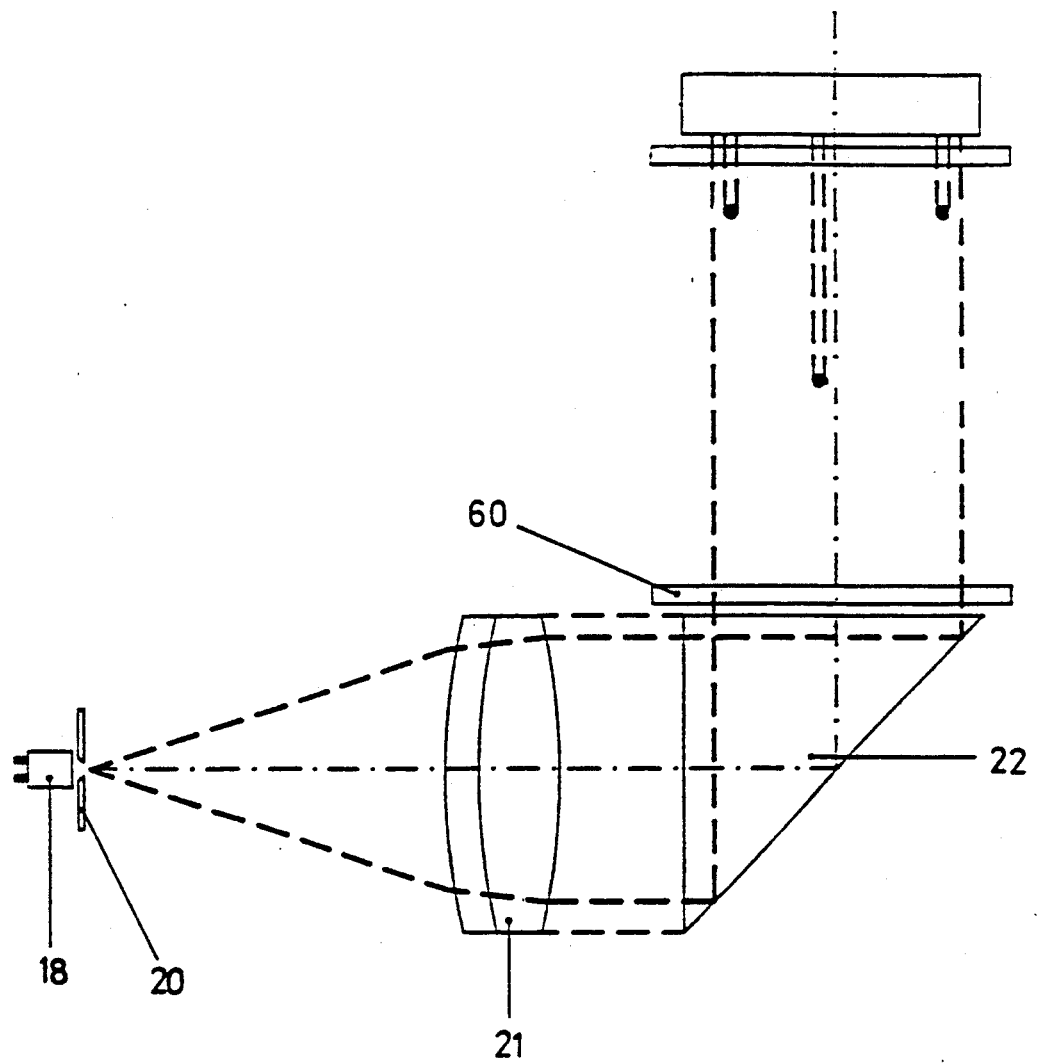
FIG. 9 shows a schematic view of the optical scheme of the telecoordinometer, whether in unidirectional or bidirectional version.

The optical emitter unit 4 (reference is made also, in particular, to FIG. 9) comprises — listed in the direction of movement of the emitted light beam — a light source 18, such as, e.g., a LED, a diaphragm 20 and the relevant moving parts for focusing purposes (not illustrated in the figures), a collimator objective 21, a right-angle prism 22 and protecting baffles 60. The receiver element 5, which is housed under a plate 23 kept spaced apart from the optical emitter unit 4 by uprights 24 constrained to the base 53, comprises one single CCD array 25 (reference is made in particular to FIG. 10).

The adjustment of the focusing of the diaphragm 20 is carried out only once at the laboratory, at the time of instrument assembly.

The single CCD array which, in the herein exemplified case, has a total equivalent length of about 60 mm, is obtained by uniting three conventional array elements 50, 51 and 52 in such a way that the end portion of the first array element 50 is arranged side-by-side to the initial portion of the second array element 51, and the end portion of the second array element 51 is arranged side-by-side to the initial portion of the third array element 52.

This arrangement results in the single CCD array 25 of total length slightly shorter than the sum of the lengths of the three array elements 50, 51 and 52, and which is capable of covering the whole measuring range the instrument is designed for.

The receiver element 5 is associated with an electronic control system 26 which processes the data received from the CCD array elements 25 (such a processing is carried out by taking into due account the mutual connection of said CCD array elements)

In this regard, when it is being manufactured, each instrument is submitted at the manufacturer's laboratory to a procedure called "initialization procedure", briefly illustrated in the following.

A glass sheet is provided with two mutually parallel photoengraved lines arranged at a suitable distance, i.e., such that the shadows generated by such lines fall simultaneously on the single CCD array 25, at the end portions, arranged side-by-side, of the three array elements 50, 51, 52.

The parameters which make it possible to accomplish functional continuity of the single CCD array (elements 50, 51 and 52) are permanently stored (in a non-volatile mode) in a ROM storage of the electronic system. This system controls the instrument.

Figure 11:
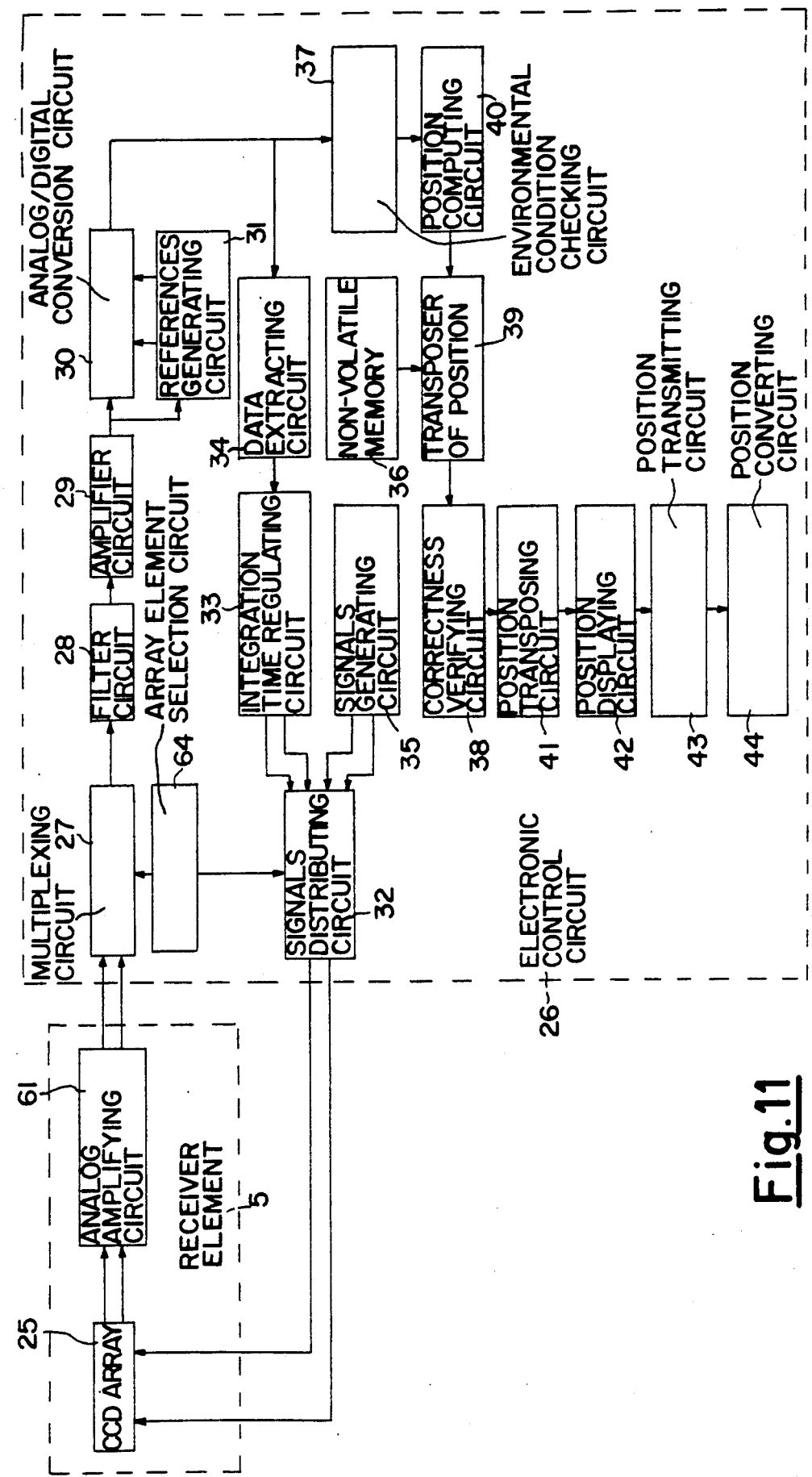
FIG. 11 shows a functional block diagram of the electronics of the instrument.

Both the receiver element 5 and the electronic control system 26 are illustrated by means of a functional block diagram in FIG. 11.

Referring to FIG. 11, the receiver element 5 comprises: the single CCD array 25 and a circuit 61 for the analog amplifying of the data relevant to the curve of lighting of the array elements. The electronic control circuit comprises: a multiplexing circuit 27, a filter circuit 28, an amplifier circuit 29, an analog/digital conversion circuit 30, and a references generating circuit 31. To completely use the conversion range, an array element selection circuit 64 and a circuit 32 distributes the signals which are addressed to the array elements a circuit 33 which performs the regulation of the integration time in order to conform the exposure to the lighting, a circuit 34 for the extraction of the data relevant to the average lighting of the array elements, a circuit 35 for the generation of the array management signals, a non-volatile memory circuit 36 which contains the data relevant to the geometrical characteristics of the sensor, a circuit 37 which checks the environmental conditions in order to make it possible the data acquisition to take place correctly, a circuit 38 which verifies the correctness of the computed data relatively to the absolute reference, a circuit 39 for the transposition of the positions of the shadows of the pins in the absolute reference, a circuit 40 for computing the position of the shadows of the pins in the relative reference relevant to each CCD array element, a circuit 41 for transposing the position of the shadows of the pins in engineering units, a circuit 42 for displaying the position of the shadows of the pins on a display, a circuit 43 for transmitting the position of the shadows of the pins to two serial lines and finally a circuit 44 for converting the position of the shadows of the pins into the analog form.

The detector apparatus 3 is protected during its operation by a cap-shaped case 45 provided with mutually opposite slots 46 through which the horizontal line 2 passes.

The horizontal line 2 is installed already during the building of the structure to be monitored 8. Then the "L"-shaped plate is constrained to the structure 8, without possibility of removal. The "L"-shaped plate is already complete with the fork-shaped support 6 and the relevant pins 9 and 10. The detector apparatus 3 is fastened to the horizontal portion 12 of the plate 7.

The spherical-end feet 14 get engaged inside the conical hollow 15, the cylindrical hollow 16 and the triangular groove 17. The dimensions of the spherical-end feet 14 and the dimensions of the conical hollow 15, of the cylindrical hollow 16 and of the triangular groove 17 fit each other with tolerances, such as to make it possible a plurality of detector apparatuses, possibly replacing each other, to be assembled and disassembled in sequence a plurality of times onto/from a same plate 7.

The structure of said forced-trueing/positioning means 14–17 is such that they can correctly operate also in the presence of thermal expansions.

The detector apparatus 3 operates enclosed inside the interior of the cap-shaped case 45.

Figure 10:
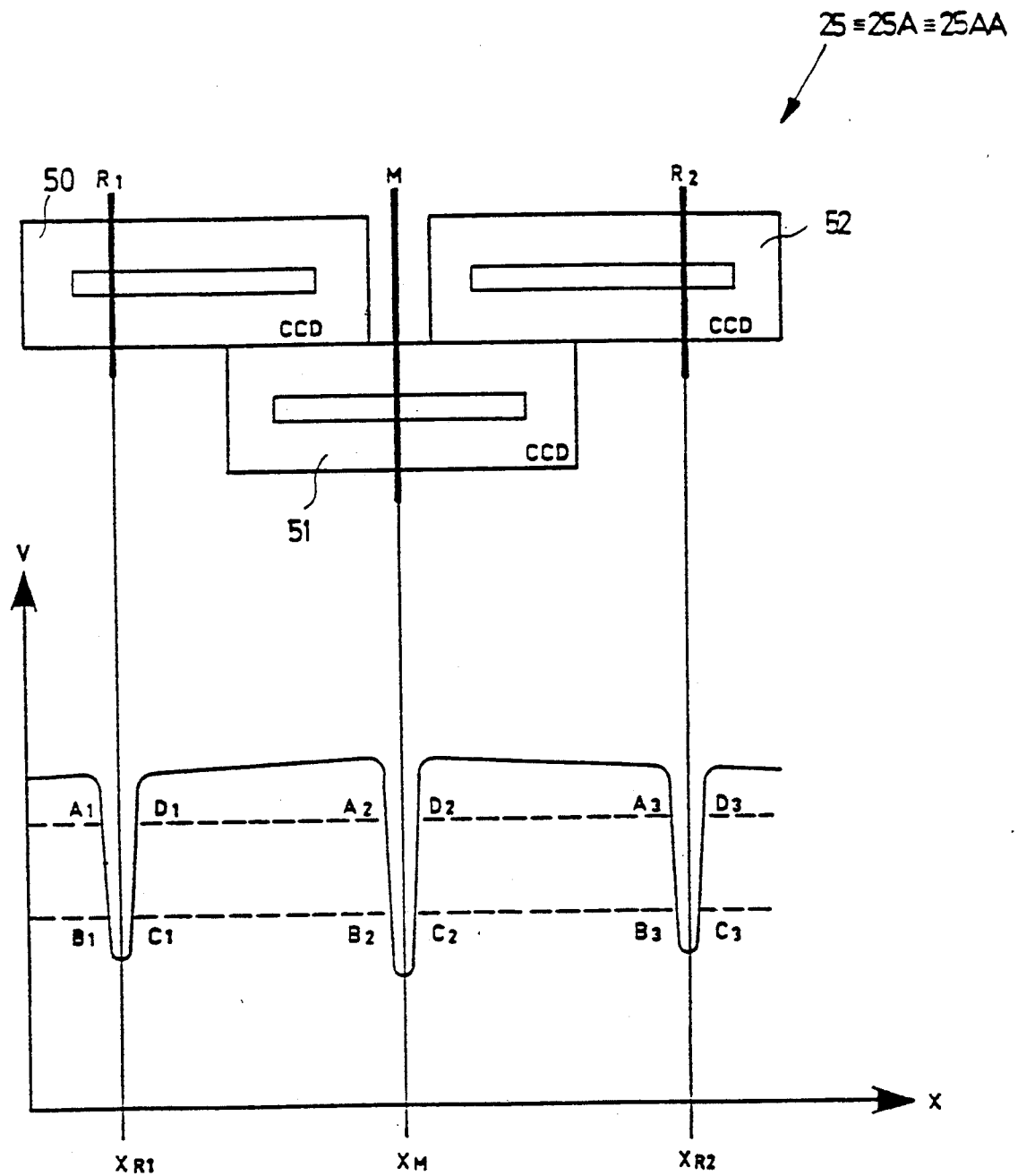
FIG. 10 shows a schematic view illustrating the principle of the measurement.

The light source 18 emits with continuity a light beam which, suitably diaphragmed, collimated and reflected, projects the shadow of the pins 9, 10 and of the portion or the line 2 which runs alongside of them in the region of the fork-shaped support 6, onto the single CCD array 25 as depicted in FIG. 10.

The V-X chart of FIG. 10 evidences the light intensity/space function. The mutually parallel short-dashed lines individuating the points $A_1$, $D_1$, $A_2$, $D_2$, $A_3$, $D_3$, $B_1$, $C_1$, $B_2$, $C_2$, $B_3$, $C_3$, define the range inside which the values of light intensity/space function can be detected by the instrument. When the instrument operates, the light intensity with which the single CCD array 25 is lighted reaches its minimum values in correspondence of the shadows Rhd 1, $R_2$ and M respectively generated by the pins 9, 10 and by the line 2. If by means of the symbols $X_{R1}$, $X_M$ and $X_{R2}$ we respectively indicate the abscissae of the shadows projected by the first pin 9, by the horizontal line 2, and by the second pin 10, the receiver element 5 and the relevant electronic system evaluate the position of the horizontal taut line 2 relatively to at least one of the pins 9 and 10. More specifically, the first pin 9 is used as the origin of the measurement range and therefore the position of the taut line 2 is referred to that pin. By comparing two or more successively measured values, the entity of the shifts of the structure 8 relatively to the line 2 can be established during time.

The distance existing between $X_{R1}$ and $X_{R2}$ is constant over time and therefore is used in order to verify the correct operation of a same detector apparatus 3 during time, or the correct operation of a plurality of detector apparatuses 3 which are alternatively used on the "L"-shaped plate 7. Each lack of congruence with the correct, stored value is signalled.

In any case, inasmuch as the "L"-shaped plate 7, as well as the line 2, cannot be removed, whenever the currently installed detector apparatus is replaced by another one, the new installed apparatus, if correctly operating, should supply measured values which are perfectly coherent with those as detected by the preceding apparatus, in that the reference of the new apparatus is the same as of the replaced apparatus.

Each apparatus 3 which is used from time to time on the "L"-shaped plate 7 uses the same references as of the previously used apparatus.

The presence of the two reference pins 9 and 10 makes it possible a continuous functional (on-line) testing of the instrument to be carried out, with the validation being carried out of the meaured values. A already said, the easy interchangeability of the detector apparatuses 3 makes it possible the static behaviour of the monitored structure to be reconstructed without discontinuities over time. The detector apparatus 3 uses a collimated light beam.

The collimator objective 21 has, in the herein exemplified case, a diameter of 50 mm, and was designed in order to minimize the aberrations for a light with a wavelength of 626 nm.

The collimated light beam is projected by the optical emitter unit 4 directly without the aid of any means for focusing the shadow of the plumb line 2 and the shadow of the pins 9 and 10 onto the single CCD array 25.

The so obtained shadows are hence always perfectly defined even if they are obtained from objects arranged on optical fields with different depths.

In such a way, the shadow of the taut line can be located with the same high precision also when said taut line undergoes shifts parallel to the optical axis as it occurs, e.g., in the bidirectional instrument (disclosed in the following), in which the shift perpendicular to the measuring axis along a direction is parallel to the optical axis of the other direction.

Inasmuch as the optical emitter unit operates with a direct projection, with a magnification ratio of 1, the measured value of the shift of the shadow on the CCD sensors is exactly equal to the actual shift undergone by the plumb line.

This fact furthermore contributes to keep high the value of the resolution degree of the instrument. As already said, the single CCD array 25 is composed by three array elements 50, 51, 52. In order to correctly establish the relations of the array elements with one another, a procedure — called the "initialization procedure" — is carried out at the manufacturer's laboratory. According to such a procedure, a glass sheet with two mutually parallel photoengraved lines arranged at a suitable distance from each other, is superimposed to the set of CCD arrays in such a way that the shadows generated by said two photo-engraved lines simultaneously overlap to the CCD arrays to be connected with one another. The parameters which accomplish the functional continuity of the array elements are stored in a non-volatile mode in the ROM memory the instrument control electronics is equipped with.

The instrument can operate in continuous fashion thanks to the adoption of a LED light source having an extremely long useful life and to the process of detection of the distance, the measured value of which is continuously updated (in the herein exemplified case, a reading is carried out every 0.1 seconds); and to the absence of any wear which might affect the operation of the sensor constituted by the single CCD array 25, and of the mechanical and optical parts in general.

The continuous updating of the measured value is obtained by means of a high-speed sampling of the pixels of the CCD array. Thanks to the high resolution of the optical elements, and to the methodology with which the measurement is carried out, no accessory elements have to be installed on the taut line 2.

Referring in particular to FIGS. 5-8, the telecoordinometer according to the present invention is also accomplished in bidirectional version by exploiting the same basic structure of the unidirectional telecoordinometer.

More specifically, the absolute reference element comprises, e.g., a vertical taut line 2A, which constitutes a part of a straight or reverse plumb line. The means for detecting the position of the structure relatively to said reference element comprise a detector apparatus 3A composed by two optical emitter units 4A and 4AA and relevant receiver elements 5A and 5AA arranged according to a pair of perpendicular planes.

The relative reference element comprises a pair of supports 6A and 6AA also arranged according to a pair of perpendicular planes. Each of said supports bears a first reference pin 9A, 9AA and a second reference pin 10A, 10AA, also aligned according to perpendicular planes.

The supports 6-6A are constrained to a flat plate 7A, which in its turn is horizontally constrained to the structure 8 to be monitored.

The optical emitter unit indicated by the reference numeral 4A is identical to the optical emitter unit 4, whilst the optical emitter unit 4AA is different from the previously mentioned units owing to the absence of an optical prism, in that in this latter case it is no longer necessary to operate a 90° deflexion of the exiting light beam. The optical emitter unit 4AA emits a light beam directed towards the relevant receiver element 5AA, which is perpendicular to the light beam emitted by the emitter optical unit 4A which, on the contrary, is directed towards the relevant receiver element 5A.

Both of said light beams intercept the vertical line 2A and project the shadows thereof onto the single CCD arrays 25A and 25AA. The optical emitter units 4A, 4AA, the receiver elements 5A, 5AA are all constrained to a flat base 53A. Between said flat base 53A of the detector apparatus 3A and the "L"-shaped plate 7A, forced-trueing/positioning means are interposed, which, also in this case, are of male-female type. However, the male portions are associated in this case with the horizontal plate 7A, whilst the female portions are associated with the base 53A; the spherical-end feet 14A are housed on the plate 7A and the cone-shaped hollow 15A, the cylindrical hollow 16A and the triangular-cross-section groove 17A are all provided on the base 53A.

The detector apparatus 3A comprises finally a cap-shaped case 45A. in order to make it possible the apparatus 3A to be installed in place while the vertical line 2A is already installed, the plate 7A, the base 53A and the cap-shaped case 45 are all provided with slots, respectively indicated by the reference numerals 54A, 55A, 56A ending into openings respectively indicated by the reference numerals 57A, 58A and 59A, inside which the taut line 2A can freely move without interfering with the detector apparatus 3A.

A knob-screw 13A completes the telecoordinometer 1A.

We claim:

1. A device for detecting displacement of a structure, wherein the device comprises an absolute reference element having a main axis and detection means for detecting the position of the structure relative to the absolute reference element, wherein the structure is attached to the earth, and wherein the device comprises:
   a) a relative reference element fixedly attached to the structure and positioned between the absolute reference element and the detection means, wherein said relative reference element comprises:
      1) a first pin having a main axis, wherein said main axis of said first pin is parallel to the main axis of the absolute reference element, and
      2) a second pin having a main axis, wherein said main axis of said second pin is parallel to the main axis of the absolute reference element;
   wherein said first pin and said second pin are on opposite sides, one from the other, of the absolute reference element and wherein the distance between said first pin and said second pin represents a sample distance for calibrating the detection means so that the detection means detects the position of the structure relative to the absolute reference element by detecting changes in the distance between the absolute reference element and at least one of said pins and the detection means calibrates and checks itself by detecting said sample distance.

2. The device of claim 1, further comprising positioning means for trueing the device, wherein said positioning means is positioned between the detection means and said relative reference element.

3. The device of claim 2, wherein the detection means comprises and emitting means attached to the device for emitting a signal and a receiving means attached to the device for receiving said signal, wherein said emitting means and said receiving means are on opposite sides, one from the other, of the absolute reference element and wherein said pins are interposed between said emitting means and said receiving means for detection thereby.

4. The device of claim 3, wherein said signal comprises a light source and said emitting means further comprises a diaphragm attached to said omitting means for controlling the output of said signal, a focusing means attached to said emitting means for focusing said signal, a collimating means attached to said emitting means for focusing said signal, and protecting baffles attached to said emitting means for protection of said emitting means.

5. The device of claim 4, wherein said emitting means further comprises a right angle prism attached to said emitting means for redirecting said signal 90°.

6. The device of claim 3, wherein said receiving means comprises at least one CCD array.

7. The device of claim 3, wherein said receiving means comprises a plurality of CCD arrays, wherein said plurality of CCD arrays are positioned alongside one another.

8. The device of claim 2, wherein said positioning means comprises at least three male elements and at least three female elements for coacting with said male elements, wherein each of said male elements comprises a non-aligned spherical end, and wherein each of said female elements comprise a cone shaped hollow, a cylindrical hollow aligned with said cone shaped hollow, and a groove having a triangular cross section aligned with said hollows for accepting said end of each of said male elements.

* * * * *